(12) United States Patent
Storey

(10) Patent No.: US 11,026,378 B2
(45) Date of Patent: **\*Jun. 8, 2021**

(54) VERTICAL HYDROPONIC PLANT PRODUCTION APPARATUS

(71) Applicant: University of Wyoming, Laramie, WY (US)

(72) Inventor: Nathaniel R. Storey, Laramie, WY (US)

(73) Assignee: University of Wyoming, Laramie, WY (US)

( \* ) Notice: Subject to any disclaimer, the term of this patent is extended or adjusted under 35 U.S.C. 154(b) by 815 days.

This patent is subject to a terminal disclaimer.

(21) Appl. No.: 15/289,576

(22) Filed: Oct. 10, 2016

(65) Prior Publication Data

US 2017/0027119 A1    Feb. 2, 2017

Related U.S. Application Data

(63) Continuation-in-part of application No. 15/098,744, filed on Apr. 14, 2016, now Pat. No. 10,638,677, which is a continuation-in-part of application No. 13/666,996, filed on Nov. 2, 2012, now Pat. No. 9,380,751, and a continuation-in-part of application No. 13/134,614, filed on Jun. 10, 2011, now Pat. No. 9,491,915, which is a continuation-in-part of
(Continued)

(51) Int. Cl.
*A01G 31/02* (2006.01)
*A01G 31/04* (2006.01)

(52) U.S. Cl.
CPC ............. *A01G 31/04* (2013.01); *A01G 31/02* (2013.01); *Y02P 60/21* (2015.11)

(58) Field of Classification Search
CPC .. A01G 31/00; A01G 2031/006; A01G 31/02; A01G 31/06; A01G 9/00; A01G 31/04
See application file for complete search history.

(56) References Cited

U.S. PATENT DOCUMENTS 2,152,869 A    4/1939  Campbell
2,292,619 A    8/1942  De Smidt
(Continued)

FOREIGN PATENT DOCUMENTS

GB    2265536    6/1993
GB    2343829    5/2000

OTHER PUBLICATIONS

Australian Patent Office Search Report, (Application No. 201081721) dated Jul. 31, 2015.
(Continued)

*Primary Examiner* — Thanh Pham
(74) *Attorney, Agent, or Firm* — Weatherly IP Solutions, LLC; James Weatherly

(57) ABSTRACT

A vertical hydroponic plant production apparatus for allowing vertical hydroponic greenhouse crop production is provided. The apparatus comprises a hollow grow tube having a front face, a back face, an open first end, and an open second end. A slot is formed in the front face of the grow tube. A media material is insertable into the grow tube. The grow tube is positionable in either a horizontal position, vertical position, or any position between the horizontal position and the vertical position allowing inclined, multi-angled crop production and multi-storied conveyor style crop production.

8 Claims, 13 Drawing Sheets

Related U.S. Application Data application No. 12/804,931, filed on Aug. 2, 2010, now Pat. No. 8,327,582, said application No. 13/666,996 is a continuation-in-part of application No. 12/804,931, filed on Aug. 2, 2010, now Pat. No. 8,327,582.

(60) Provisional application No. 61/273,317, filed on Aug. 3, 2009.

(56) References Cited

U.S. PATENT DOCUMENTS

| | | | |
|---|---|---|---|
| 3,368,303 | A | 2/1968 | Duncan |
| 4,035,950 | A | 7/1977 | Anselm |
| 4,070,793 | A | 1/1978 | Dillon |
| 4,095,608 | A | 6/1978 | Holmes |
| 4,175,355 | A | 11/1979 | Dedolph |
| 4,268,994 | A | 5/1981 | Urai |
| 4,310,990 | A | 1/1982 | Payne |
| 4,415,137 | A | 11/1983 | Garves |
| 4,454,684 | A | 6/1984 | O'Hare |
| 4,476,651 | A | 10/1984 | Drury |
| 4,566,607 | A | 1/1986 | Smith |
| 4,932,158 | A | 6/1990 | Roberts |
| 5,097,627 | A | 3/1992 | Roberts |
| 5,293,713 | A | 3/1994 | Ahmed |
| 5,363,594 | A | 11/1994 | Davis |
| 5,490,374 | A | 2/1996 | Calende |
| 5,555,676 | A | 9/1996 | Lund |
| 5,987,812 | A | 11/1999 | Knell |
| D420,554 | S | 2/2000 | Evans |
| 6,727,091 | B2 | 4/2004 | Darlington |
| 6,751,903 | B2 | 6/2004 | Shryock |
| 6,840,007 | B2 | 1/2005 | Leduc |
| 6,840,008 | B1 | 1/2005 | Bullock |
| 8,122,642 | B1 | 2/2012 | Huberman |
| 2003/0052398 | A1 | 3/2003 | Utsumi |
| 2003/0089037 | A1 | 5/2003 | Ware |
| 2004/0103583 | A1 | 6/2004 | Eriksen |
| 2004/0200148 | A1 | 10/2004 | Schuck |
| 2005/0055878 | A1 | 3/2005 | Dumont |
| 2005/0055879 | A1 | 3/2005 | Darlington |
| 2006/0032128 | A1 | 2/2006 | Bryan |
| 2006/0107589 | A1 | 5/2006 | Rubin |
| 2006/0117656 | A1 | 6/2006 | Graham et al. |
| 2006/0150485 | A1 | 7/2006 | Somerville |
| 2006/0156624 | A1 | 7/2006 | Roy et al. |
| 2006/0219853 | A1 | 10/2006 | Molina |
| 2007/0062113 | A1 | 3/2007 | Rubin et al. |
| 2007/0144069 | A1 | 6/2007 | Gottlieb |
| 2007/0214717 | A1 | 9/2007 | Larwood |
| 2008/0034653 | A1 | 2/2008 | Ramsey et al. |
| 2008/0209804 | A1 | 9/2008 | Stradiot |
| 2009/0056221 | A1 | 3/2009 | Ramsey et al. |
| 2009/0288341 | A1 | 11/2009 | Kania et al. |
| 2011/0016782 | A1 | 1/2011 | Harder |
| 2011/0232188 | A1 | 9/2011 | Kennedy |
| 2014/0115960 | A1 | 5/2014 | Kantola |
| 2015/0342127 | A1 | 12/2015 | Gallant |

OTHER PUBLICATIONS

PCT Written Opinion and Search Report, (PCT/US2010/002157) dated Nov. 16, 2010.

European Patent Office Search Report, (Application No. 10806748.9) dated Apr. 21, 2015.

European Patent Office Action, (Application No. 10806748.9) dated Jul. 19, 2016.

Response to European Patent Office Action, (Application No. 10806748.9) dated Jan. 19, 2017.

European Patent Office Search Report, (Application No. 17195489.4) dated Feb. 28, 2018.

VERTICAL HYDROPONIC PLANT PRODUCTION APPARATUS

CROSS REFERENCE TO RELATED APPLICATIONS

The present application is a continuation-in-part and claims priority to pending U.S. patent application Ser. No. 15/098,744, filed Apr. 14, 2016, U.S. Pat. No. 9,380,751, filed Nov. 2, 2012, and U.S. patent application Ser. No. 13/134,614, filed Jun. 10, 2011, both of which are a continuation-in-part of U.S. Pat. No. 8,327,582, issued Dec. 11, 2012 (U.S. application Ser. No. 12/804,931, filed on Aug. 2, 2010), entitled "Vertical Hydroponic Plant Production Apparatus", which claims benefit of priority of provisional patent application No. 61/273,317, filed on Aug. 3, 2009, entitled "Vertical Hydroponic Plant Production Apparatus", the entire contents of all of these references are herein incorporated by reference.

BACKGROUND

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers. Little technology exists that allows vertical plant displays that are highly scalable.

The foregoing examples of the related art and limitations related therewith are intended to be illustrative and not exclusive. Other limitations of the related art will become apparent to those of skill in the art upon a reading of the specification.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

An embodiment of the present invention comprises a vertical hydroponic plant production apparatus, the apparatus comprising: a hollow grow tube and a media material insertable into the grow tube, where the grow tube is positionable in either a horizontal position, vertical position, or any position between the horizontal position and the vertical position allowing inclined, multi-angled crop production and multi-storied conveyor style crop production.

An embodiment of the present invention comprises a method of growing a plant in a vertical hydroponic plant production apparatus, the apparatus comprising: providing a hollow grow tube; providing a media material insertable into the grow tube; where the grow tube is positionable in either a horizontal position, vertical position, or any position between the horizontal position and the vertical position allowing inclined, multi-angled crop production and multi-storied conveyor style crop production; inserting one or more plants into the media material and growing the one or more plants in the media material; and harvesting the one or more plants from the media material.

Additional advantages of the present invention will become readily apparent from the following discussion, particularly when taken together with the accompanying drawings.

BRIEF DESCRIPTION OF THE DRAWINGS

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Embodiments of the present disclosure include various apparatuses, systems and methods for the cultivation and transport of organisms, including but not limited to, various forms of plants and fungi in hydroponic towers. The apparatuses and systems described herein allow for organisms such as plants grown in the hydroponic towers in different environments based upon the life cycle and health of the organism as well as to transport the organisms to market. The apparatuses and systems allow for an organism, such as a plant or fungi, to be moved to and from a variety of structures including but not limited to greenhouses, warehouses, outbuildings as well as to be placed in a field. The systems described herein allow plants and fungi to be moved directly from production to market, eliminating shipping and handling issues.

Figure 1:
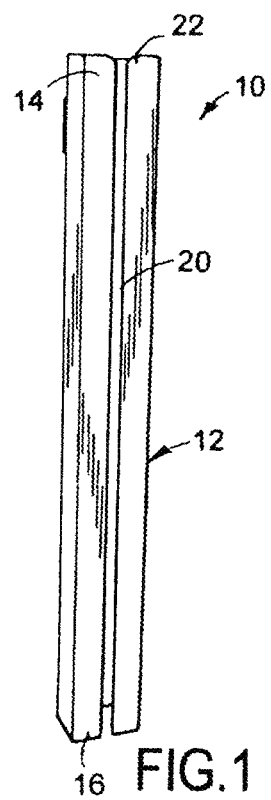
FIG. 1 is a front perspective view illustrating a grow tube of a vertical hydroponic plant production apparatus, constructed in accordance with the present invention.
Figure 2:
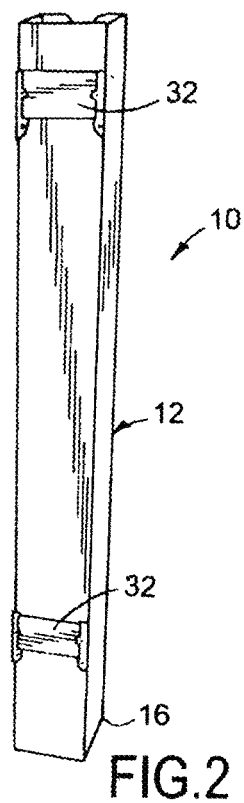
FIG. 2 is a rear perspective view illustrating the grow tube of the vertical hydroponic plant production apparatus of FIG. 1, constructed in accordance with the present invention.
Figure 3:
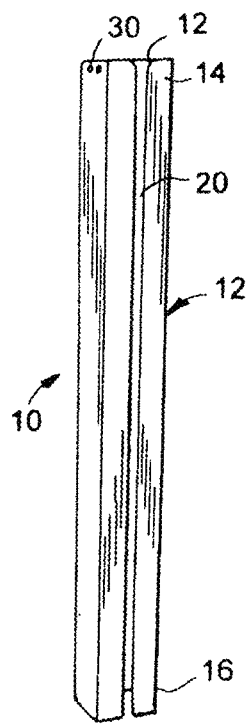
FIG. 3 is a front perspective view illustrating another embodiment of the grow tube of the vertical hydroponic plant production apparatus, constructed in accordance with the present invention.
Figure 4:
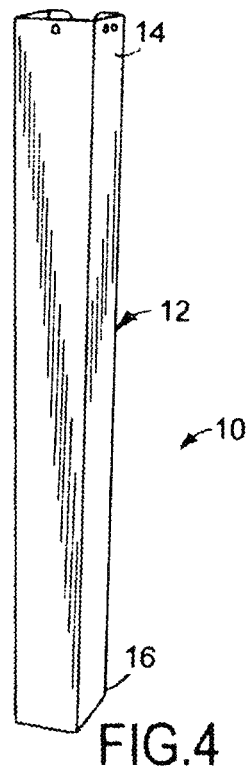
FIG. 4 is a rear perspective view illustrating the grow tube of the vertical hydroponic plant production apparatus of FIG. 3, constructed in accordance with the present invention.
Figure 5:
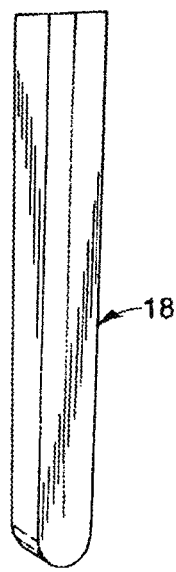
FIG. 5 is a front perspective view illustrating a media column of the vertical hydroponic plant production apparatus, constructed in accordance with the present invention.
Figure 6:
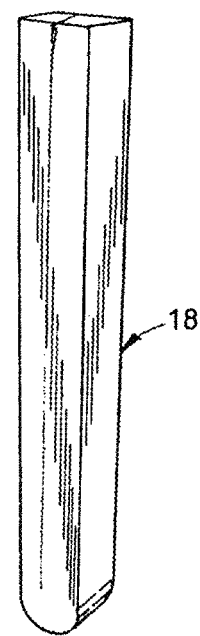
FIG. 6 is a rear perspective view illustrating the media column of the vertical hydroponic plant production apparatus of FIG. 5, constructed in accordance with the present invention.

As illustrated in FIGS. 1-19b, the present disclosure is a vertical hydroponic plant production apparatus, generally shown in FIG. 1, and indicated generally at 10, allowing vertical hydroponic greenhouse crop production in a fraction of the space necessary for traditional plant production techniques and allows utilization of vertical surfaces for plant production.

As shown in FIGS. 1-4, the vertical hydroponic plant production apparatus and system 10 of the present disclosure includes a grow tube or tower 12 usable in a horizontal position, vertical position, or any position between the horizontal position and the vertical position. The grow tube or tower 12 is highly portable, being light, making it easy to move the grow tube or tower 12 from area to area for transplant, grow out, and harvest. The grow tube or tower 12 further allows inclined, multi-angled crop production and multi-storied conveyor style crop production. The grow tube or tower 12 of the vertical hydroponic plant production apparatus and system 10 of the present disclosure also functions as aquacultural biofiltration/nutrient stripping devices for plant-based, high-efficiency waste nutrient removal and as sites nitrification processes, having massive surface area/volume thereby reducing the costs of single pass aquaculture and improving the efficiency of recirculating aquaculture.

The grow tube or tower 12 of the vertical hydroponic plant production apparatus and system 10 of the present disclosure also functions as in-store or at market display devices allowing the display of fresh, live produce for you-pick vegetable sales at market places and allowing the sale of produce that is more fresh than traditionally harvested vegetable products. Designed for easy affixation to the walls and/or roofs of buildings, the grow tube or tower 12 reduces heating and cooling costs through shading and plant evapotranspiration and performs a decorative function. The grow tube or tower 12 applied in such a manner can also reduce rooftop and hard surface water runoff depending on application and plumbing system.

Further, the vertical hydroponic plant production apparatus and system 10 of the present disclosure allows for decorative landscape designs as well as vertical plant production displays indoors for a variety of purposes. The grow tubes or towers 12 can house aromatic and decorative species of herbs that may be used for aromatherapy type interactive hallways, lobby displays, kitchen, and cafeteria displays as well as common industrial plant displays in offices and workspaces.

As shown in FIGS. 1-4, the grow tube or tower 12 of the vertical hydroponic plant production apparatus and system 10 of the present disclosure has a first end 14 and a second end 16. The grow tube or tower 12 may be provided in a variety of shapes, including but not limited to, square (shown in FIG. 1-4), rectangular, round (shown in FIG. 17), oval, octagon, pentagon, triangular, or angular tubing and contains a non-woven matrix media 18 (shown in FIGS. 5, 6, 10, 11-13) composed of any number of plastic materials, suspended vertically from the ceiling, supported by a framework, and/or standing upright on the floor using a support pole or frame. By way of example, the grow tube 12 may be constructed of a variety of materials including but not limited to metals including titanium, steel, stainless steel, aluminum, and aircraft aluminum, synthetic polymers such as nylon, plastics, such as high-density polyethylene 'HDPE', or composite materials, such as carbon-fiber-reinforced polymers, carbon-fiber-reinforced plastics and carbon-fiber reinforced thermoplastics with side walls having a width of approximately four (4") inches to six (6") inches although constructing the grow tube from a different materials, such as of metal such as aluminum or steel as well as, fiberglass, plastic or wood, with different widths and lengths is within the scope of the present invention.

As shown in FIGS. 1-4, in an embodiment of the present disclosure, the grow tube or tower 12 of the vertical hydroponic plant production apparatus and system 10 of the present disclosure has a slot 20 formed lengthwise through the grow tube 12. The slot 20 can be formed along the entire face of the grow tube 12 from the first end 14 to the second end 16 (shown in FIG. 1-4) or the slot 20 can be formed to a point approximately four (4") inches to approximately six (6") inches from the first end 14 of the grow tube 12 (shown in FIG. 9). In the case of the slot 20 formed along the entire face of the grow tube 12, the slot 20 can have angled portions 22 at the first end 14 of the grow tube 12 allowing for easy insertion and removal of the media, which will be described further below. The slot 20 allows the front face of the grow tube to expand outward during insertion of the media material and to be biased inward against the media material once the media material is inserted. The slot 20 may be provided in a variety of widths, varying from one-thirty-second (1/32nd) (shown in FIG. 18b) to 31-32$^{nd}$ (shown in FIG. 18c) the width of the face of the grow tube, or approximately one-half (½") inch to approximately three inches (3.9") inches on a 4" width face, although constructing the slot 20 with different widths is within the scope of the present invention.

Figure 18A:
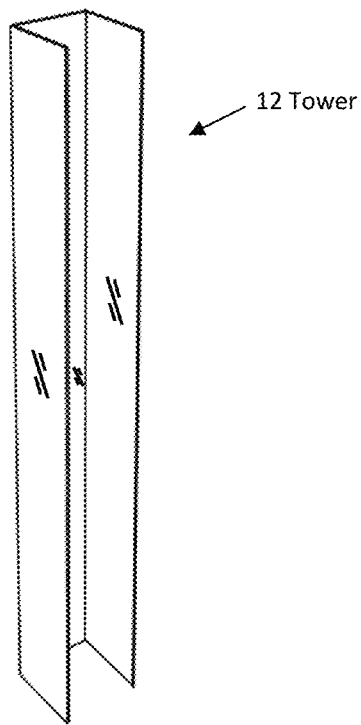
FIG. 18a is a front perspective view illustrating a hydroponic grow tube of a vertical hydroponic plant production apparatus without a front face, constructed in accordance with the present invention.
Figure 18B:
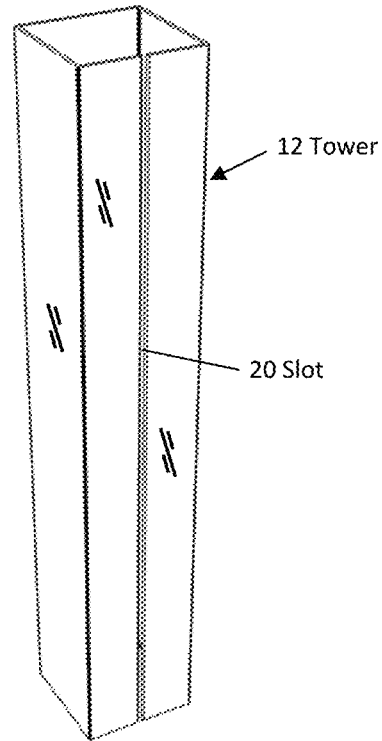
FIG. 18b is a front perspective view illustrating a hydroponic grow tube of a vertical hydroponic plant production apparatus with a small or narrow slot 20 along the front face, constructed in accordance with the present invention.
Figure 18C:
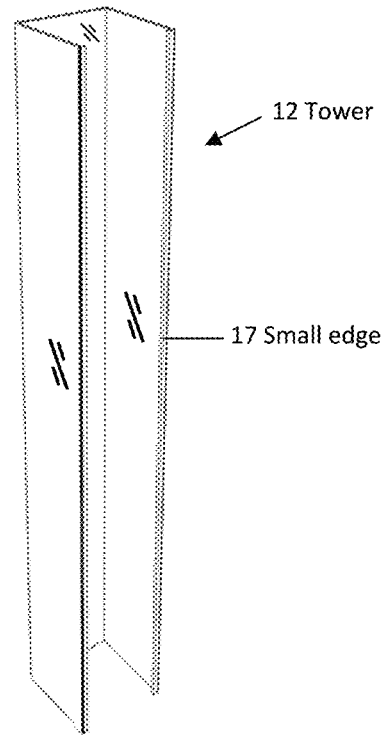
FIG. 18c is a front perspective view illustrating a hydroponic grow tube of a vertical hydroponic plant production apparatus with a small edge 17 on the front face creating a large slot along the front face, constructed in accordance with the present invention.

In FIG. 18a, another embodiment of the present disclosure is provided. As shown in FIG. 18a, the grow tube or tower 12 is provided without a front face, but with a right side, a parallel left side and a corresponding back face. In this embodiment, media material 18 is inserted in the tower 12 and supported by the right and left side as well as the back side of the tower or tube 12. Additional support for the media material 18 may be provided by using a bolt 21 (shown in FIG. 12), which spans the width of the media insert 18, joining the two halves, and/or lending structural integrity to the media insert. As will be discussed, rivets (metal or plastic), and metal bars, may also be used to provide additional support for the media material within the tower.

Figure 18D:
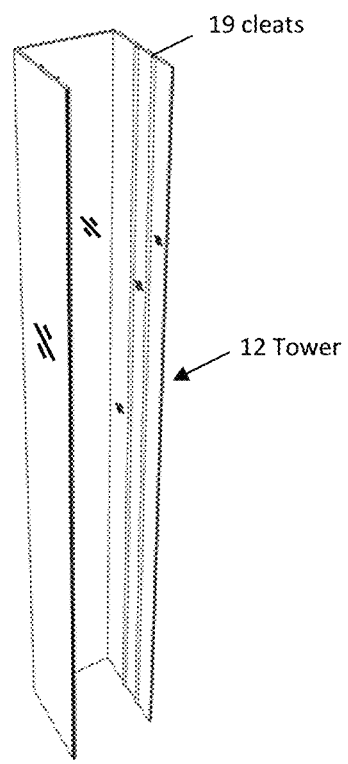
FIG. 18d is a front perspective view illustrating a hydroponic grow tube of a vertical hydroponic plant production apparatus without a front face but with cleats 19 running the length of the sidewalls, constructed in accordance with the present invention.

In FIG. 18d, another embodiment of the present disclosure is provided. As shown in FIG. 18d, the grow tube or tower 12 is provided without a front face, but with a right side, a parallel left side and a corresponding back face. In this embodiment, cleats 19 provided running the length interior walls of right side and the left side of the grow tube 12. Each cleat runs the length of the wall and provide support and pressure against the media material, helping the media material stay together and in place. In the example shown in FIG. 18d, two cleats are shown running the entire length of the right side interior wall, however any number of cleats may be used in this example, depending on the size and shape of the grow tube, the type of media and the type of plant or fungi grown in the media, as will be understood by one skilled in the art, once they understand the scope of the disclosure.

Figure 19A:
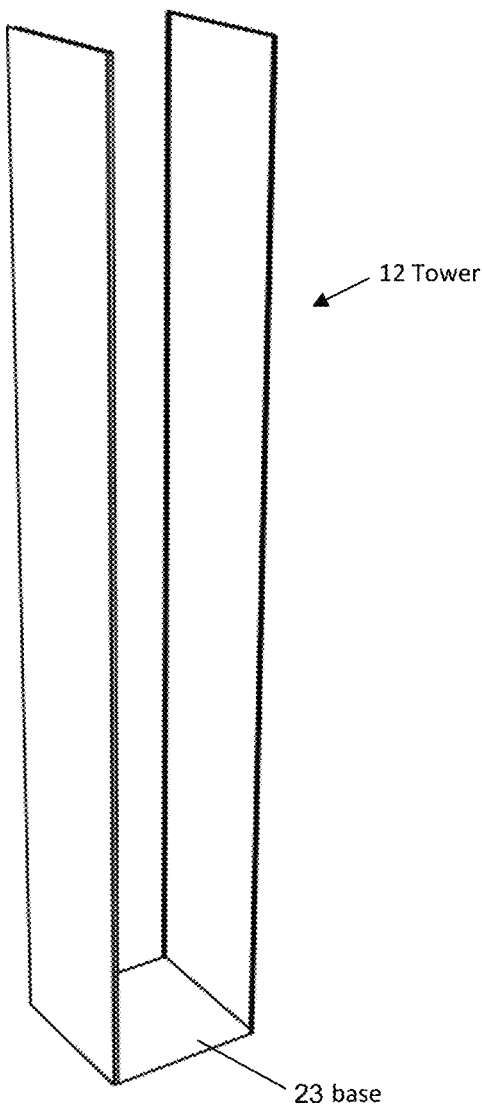
FIG. 19a is a front perspective view illustrating a hydroponic grow tube of a vertical hydroponic plant production apparatus without a front face or a backside, constructed in accordance with the present invention.
Figure 19B:
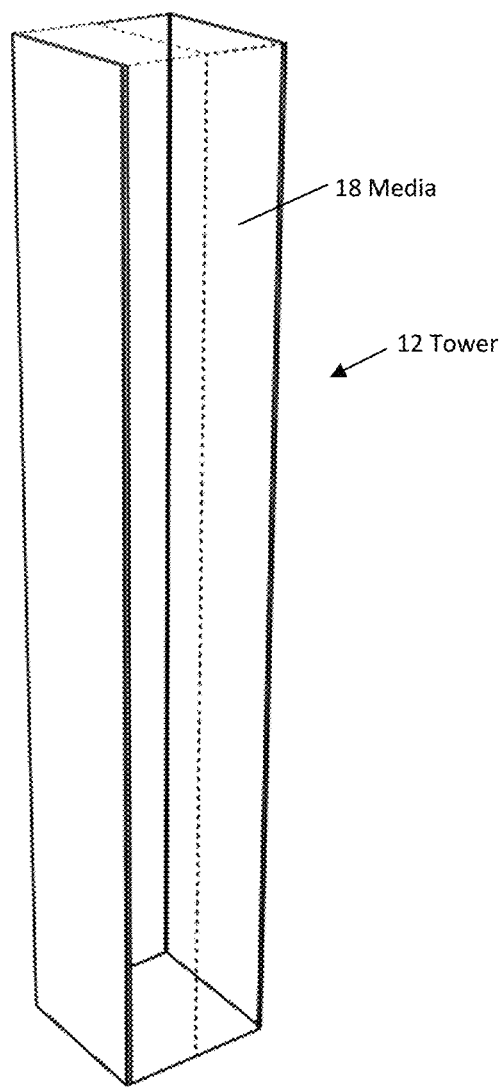
FIG. 19b is a front perspective view illustrating a hydroponic grow tube of a vertical hydroponic plant production apparatus without a front face or a backside with media material within the tube, constructed in accordance with the present invention.

In FIG. 19a, another embodiment of the present disclosure is provided. As shown in FIG. 19a, the grow tube or tower 12 is provided without a front face or a back face. In this embodiment, a base 23 is provided to operably link and provide support for a right side and left side. As shown in FIG. 19b, media material 18 is inserted in the tower 12 and supported by the right and left side of the tower or tube 12. Additional support for the media material 18 may be provided by using a bolt 21 (shown in FIG. 12), which spans the width of the media insert 18, joining the two halves, and/or lending structural integrity to the media insert. As will be discussed, rivets (metal or plastic), and metal bars, may also be used to provide additional support for the media material within the tower.

A variety of media material may be used with the system of the present disclosure. Examples of media that may be used in the system of the present disclosure may include but is not limited to, a fibrous, non-woven matrix media material, smaller media around plugs or potted plants, Styrofoam, polyurethane foam, plastic mesh, rock wool, coconut fiber, vermiculite, as well as organic soil such as potting soil.

Figure 12:
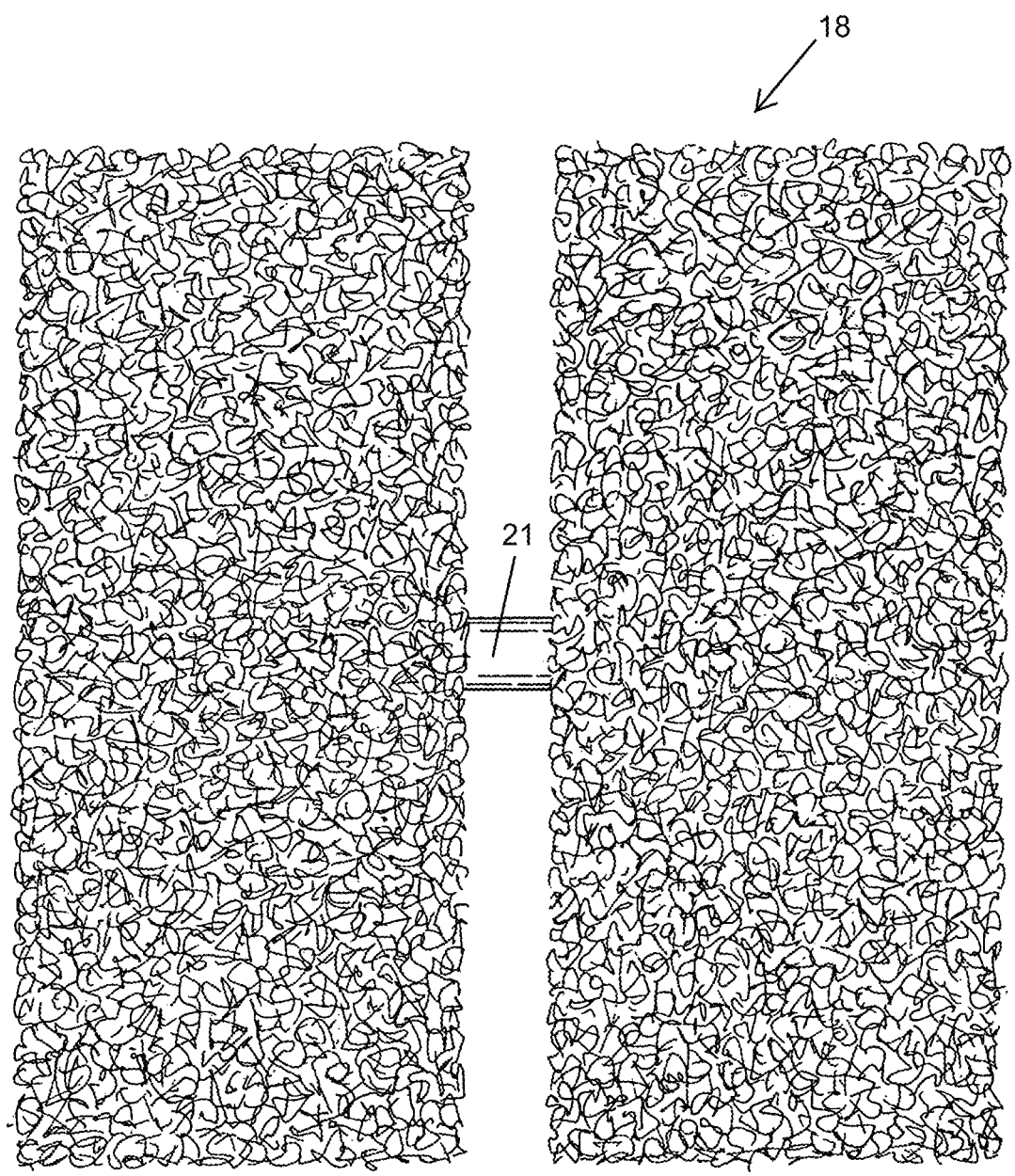
FIG. 12 is a view illustrating the media material of the vertical hydroponic plant production apparatus, with a bolt spanning the width of the two halves.
Figure 13:
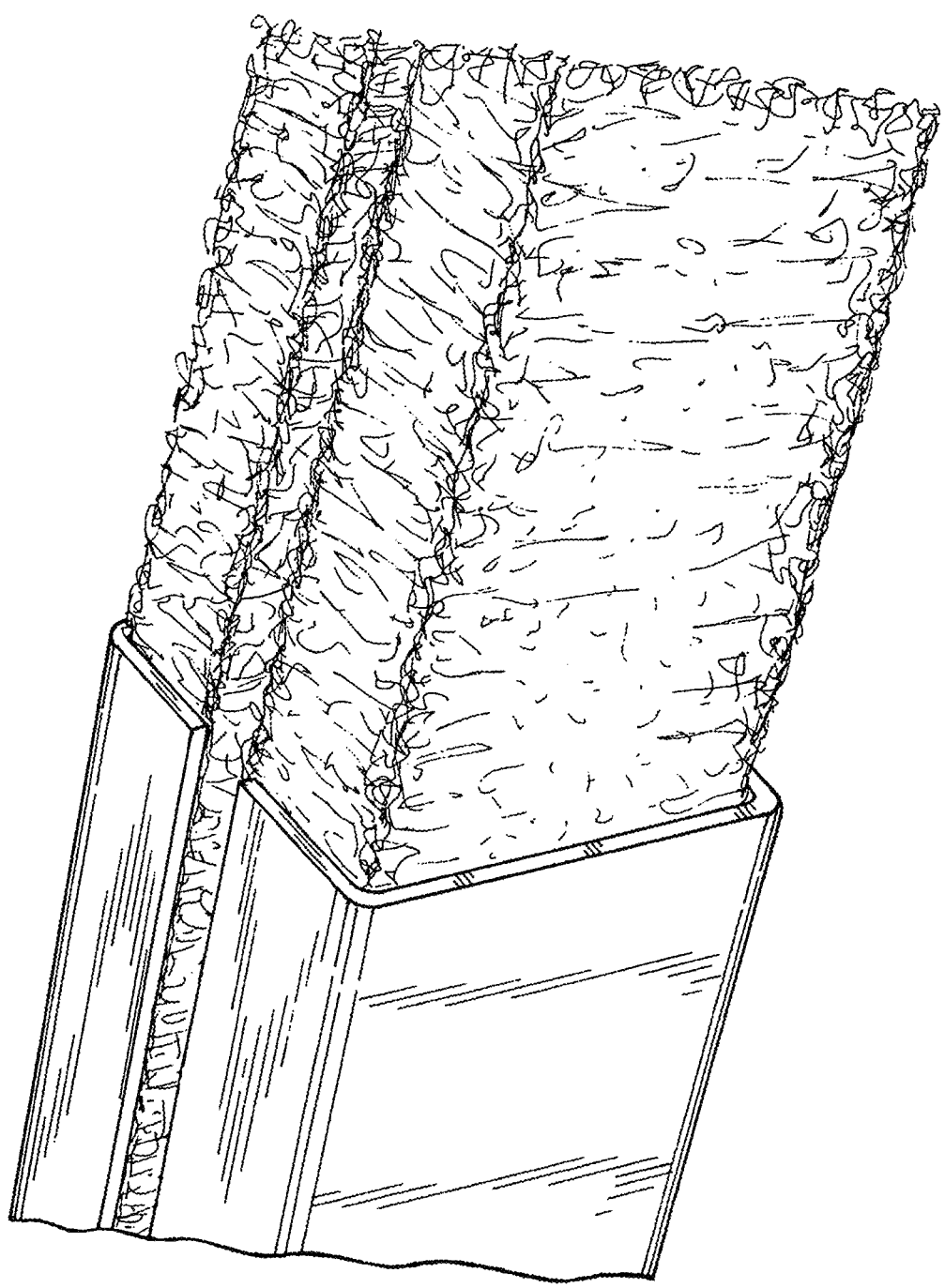
FIG. 13 is a perspective view illustrating the vertical hydroponic plant production apparatus, constructed in accordance with the present invention, with the media material having a thickness substantially half an internal width/diameter of the grow tube such that the media material is folded in the middle so that the thickness both halves together roughly equal the inside dimensions of the grow tube.
Figure 14:
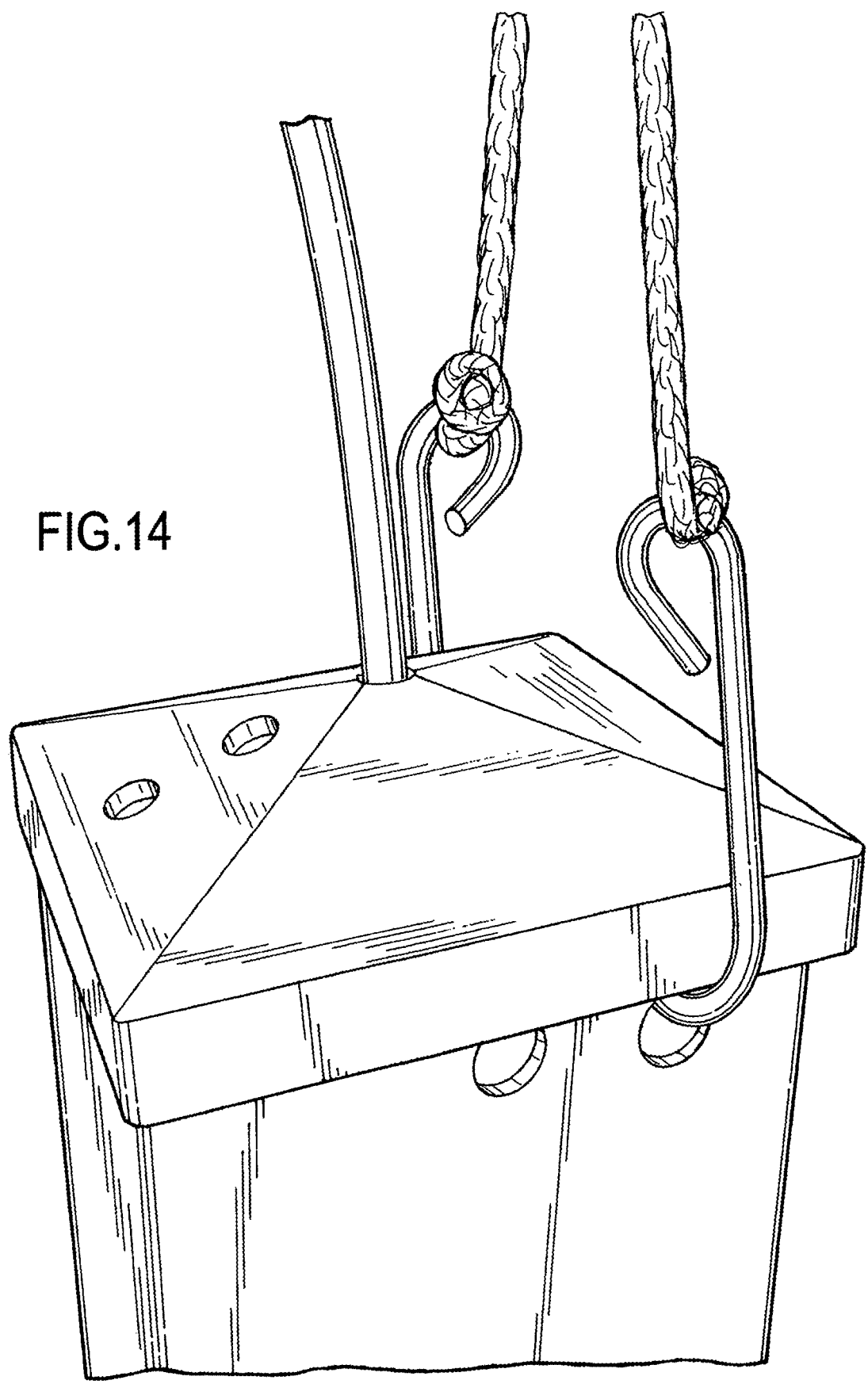
FIG. 14 is a perspective view illustrating the vertical hydroponic plant production apparatus, constructed in accordance with the present invention, with a cap and tubing extending through the cap.
Figure 15:
FIG. 15 is a perspective view illustrating the vertical hydroponic plant production apparatus, constructed in accordance with the present invention, with a nutrient solution reservoir.

As mentioned above, the vertical hydroponic plant production apparatus and system 10 of the present disclosure may have a media material 18 (shown in FIGS. 5-6, and 11-13) constructed from a polyester matrix material approximately two (2") inches thick, cut to the internal width/diameter of the grow tube, and folded in the middle so that both halves together roughly equal the inside dimensions of the grow tube or tower 12 (shown in FIG. 13). The media material 18 can also be composed of two halves cut to the internal width/diameter of the grow tube, or by way of example, approximately two (2") inch thick media or one piece of four (4") inch thick media split down the middle to within approximately four (4") inches to approximately six (6") inches of the top of the media material where a bolt 21 spans its width.

In another embodiment of the present disclosure, a bolt 21, as discussed above and shown in FIGS. 10, 11 and 12, may be used to hold the two pieces of media together. As shown in FIG. 12, this bolt 21 spans the width of the media insert 18, joining the two halves, and/or lending structural integrity to the media insert. While a bolt 21 is provided in this example, as number of other means for holding the media material together and in place may be used, included but not limited to, rivets (metal or plastic), and metal bars, as will be understood by one skilled in the art, once they understand the disclosure.

Additional means for holding the media material together, may include, the use of shrink-wrap. In this example, shrink-wrap, or a plastic film may be placed around the entire exterior of the grow tube or tower 12. Heat, such as from a heat gun, is then applied to the plastic film, inducing the film to shrink or conform to the exterior of the media material. Holes may then be punched in the plastic, allowing plants to be placed into the media material through the shrink-wrap. This embodiment of the present disclosure may be used with or without a grow tube.

In another embodiment, the bolt provides an anchor within the media, allowing a handle (shown in FIG. 8) to grasp the bolt for the purposes of inserting and removing the media 18 insert from the grow tube 12, or allowing a forked or hooked handle to be inserted into the receiver for the same purpose.

In the embodiment of the vertical hydroponic plant production apparatus 10 of the present disclosure where the media material 18 is folded in half, a pulling hook 24 with a flat hook 26 attached to a handle 28 (shown in FIG. 8) allows the media inserts 18 to be pulled into and out of the grow tube 12, with the pulling hook handle 28 extending from the slot 20 in the grow tube 12. The hook 24 consists of a piece of round bar metal bent to form a broad, flat, "L" shaped hook, roughly the width of the folded media 18 with a handle 28 affixed to the end. The hook 26 can also be attached to a pneumatic or hydraulic device that allows automated "pulling" of the media inserts 18.

For planting, seedlings or fungal tissue are placed between the two halves of media 18, or placed on the outside of the media 18 and against the vertical hydroponic plant production apparatus 10 of the present disclosure, with the upper portions out, and are "zipped" into the grow tubes 12 with the upper portions of the plant protruding through the gap in the grow tube housing 12.

In an embodiment, the top 14 of the grow tube 12 can be capped with a removable cap having holes of variable sizes drilled in the center (shown in FIG. 14), or may not be capped at all. If capped, a mister or irrigation tubing is inserted through the hole in the cap hole (shown in FIG. 14). The bottom of the grow tube 12 is either submerged in nutrient solution, rests in a drain or trough for recirculating nutrient solution, or fits into a lower pipe (shown in FIG. 16). A pump moves nutrient solution from a nutrient solution reservoir (shown in FIG. 16) to the mister or irrigation pipe at the top of the grow tube 12, where the nutrient solution is emitted and allowed to drip down through the media 18 and plant roots. Some of the nutrient solution trickles down the walls of the grow tube 12 and is captured by roots in contact with the pipe wall. Excess nutrient solution drains to the bottom of the grow tube 12 where it is drained back to the nutrient solution reservoir. High humidity is maintained within the grow tube due to the constant trickling/misting of nutrient solution. The height of the plant grow tube 12 is variable dependent on greenhouse height, and the spacing for plants is variable dependent on plant type and desired spacing. It is possible to stack grow tubes 12 on top of each other to vary height, by fitting the bottoms of the grow tubes 12 with coupling caps, to utilize conveyor production techniques.

Figure 16:
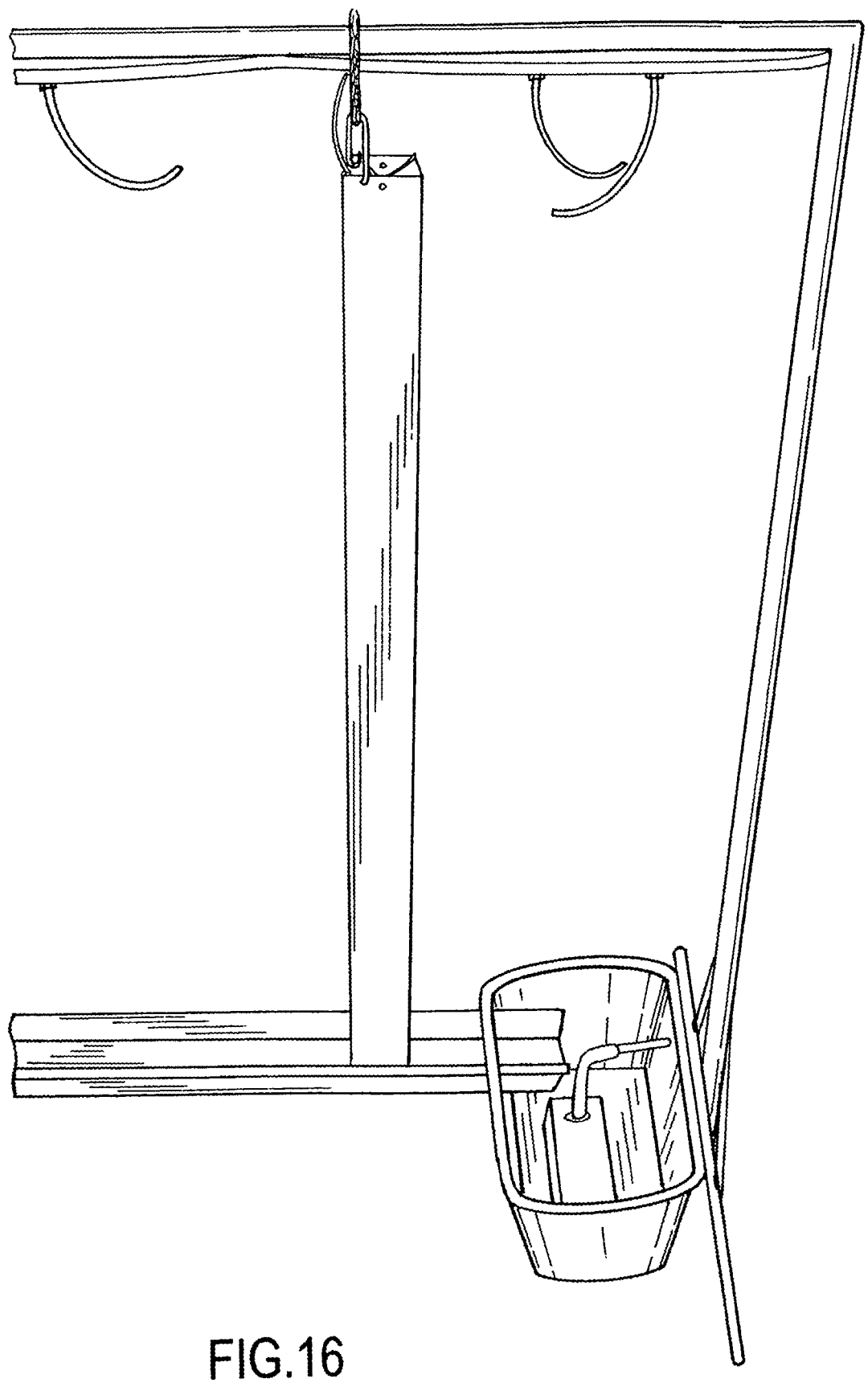
FIG. 16 is a perspective view illustrating the vertical hydroponic plant production apparatus, constructed in accordance with the present invention, with a pump.
Figure 17:
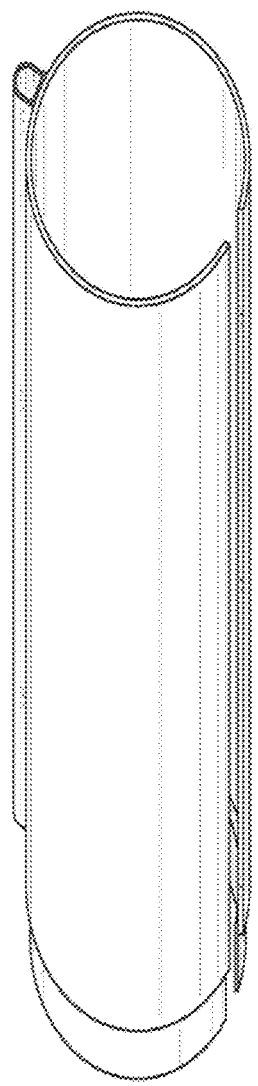
FIG. 17 is a perspective view illustrating a round grow tube of a vertical hydroponic plant production apparatus, constructed in accordance with the present invention.

In an embodiment, the reservoir shown in FIG. 16 may be provided to store and capture excess water or solution that runs through the hydroponic towers. The reservoir is operably coupled to the means of irrigation, shown as the tubing in FIG. 16. The means of irrigation is designed to be quickly connected and disconnected to a main irrigation system or means of irrigations systems coupled to the top of the tower 12. The means of irrigation may include a pump (not shown in FIG. 16) operably coupled to a pipe, hose or other conduit and which is capable of delivering water and nutrient solutions to the hydroponic tower (such as but not limited to solutions containing nitrogen, phosphorus, potassium, iron, magnesium and zinc). The means of irrigation allows water or nutrient solutions to be transported from the reservoir to the top of the tower. The water or nutrient solution may be emitted from the means of irrigation by a variety of emitters, including drip emitters, sprinklers and micro-spray emitters.

In an embodiment, a pump moves water and/or nutrient solution through the means of irrigation from the reservoir to the first end 14 of the hydroponic towers 12, distributing a nutrient solution into media material inserted in the grow tube or tower 12. The nutrient solution is allowed to drip down through the media and the roots of the plants or fungal material growing in the media. Some of the nutrient solution trickles down the walls of the hydroponic tower 12 and is captured by roots in contact with the walls of the tower 12. Excess nutrient solution drains to the bottom of the hollow grow tube 12 where it is drained into the reservoir.

The grow tubes 12 of the vertical hydroponic plant production apparatus 10 of the present disclosure can be fixed in place using hangers, rope, or strap and metal hooks that loop over a support beam or bracket and secure to the grow tube 12 or tower through holes 30 drilled at the first end of the grow tube 12. The holes 30 can be of variable size and placement depending on application, although in the most common embodiment, there are four holes 30, one pair centered on either side of the housing upper, and one pair forward (towards the front of the grow tube 12) of the centered pair allowing slight inclination of the hanging grow tube 12 if inclined growing is desired. The grow tubes 12 can also be fixed in place using a series of holes or a gap cut in the grow tube 12, allowing the grow tube to be fixed to a pole having a bracket or pressure or spring action hanging system attached to it. The grow tube 12 can also be inclined on said pole or hanging system for the purpose of inclined production.

Figure 7:
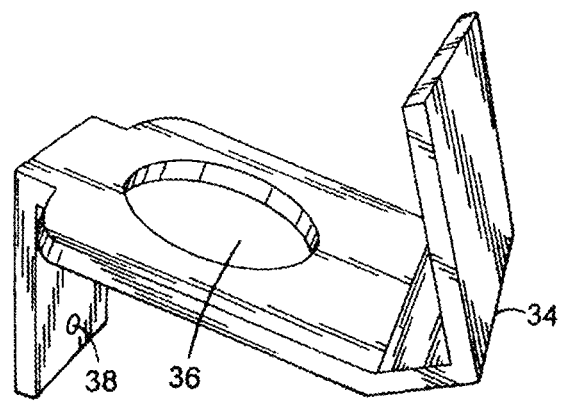
FIG. 7 is a perspective view illustrating a Z bracket of the vertical hydroponic plant production apparatus, constructed in accordance with the present invention.
Figure 8:
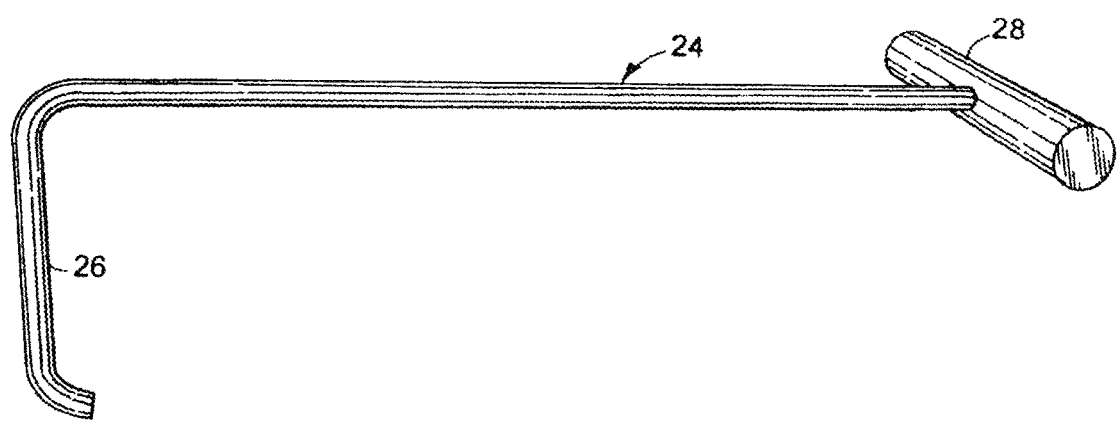
FIG. 8 is a perspective view illustrating a pulling hook of the vertical hydroponic plant production apparatus, constructed in accordance with the present invention.
Figure 9:
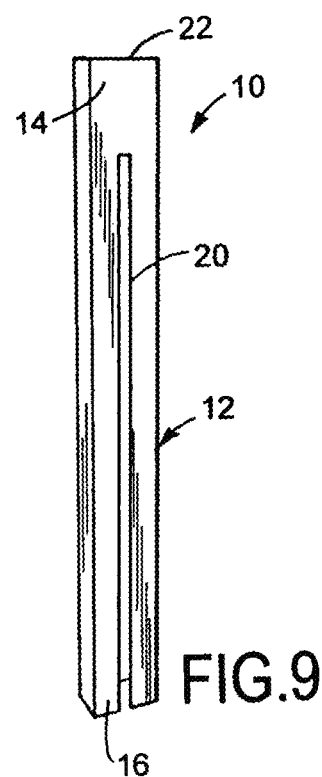
FIG. 9 is a perspective view illustrating the vertical hydroponic plant production apparatus, constructed in accordance with the present invention, with the slot formed to a point below the first end of the grow tube.
Figure 10:
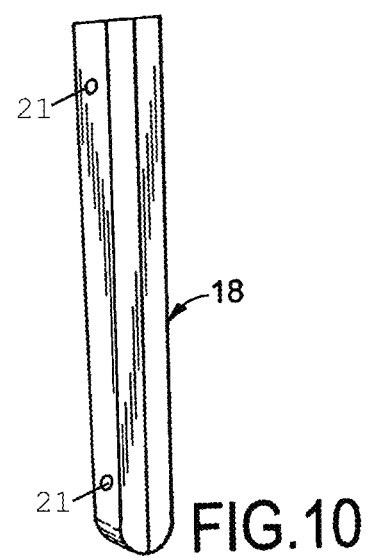
FIG. 10 is a perspective view illustrating the media material of the vertical hydroponic plant production apparatus, with the media material being composed of two halves of material split down the middle.
Figure 11:
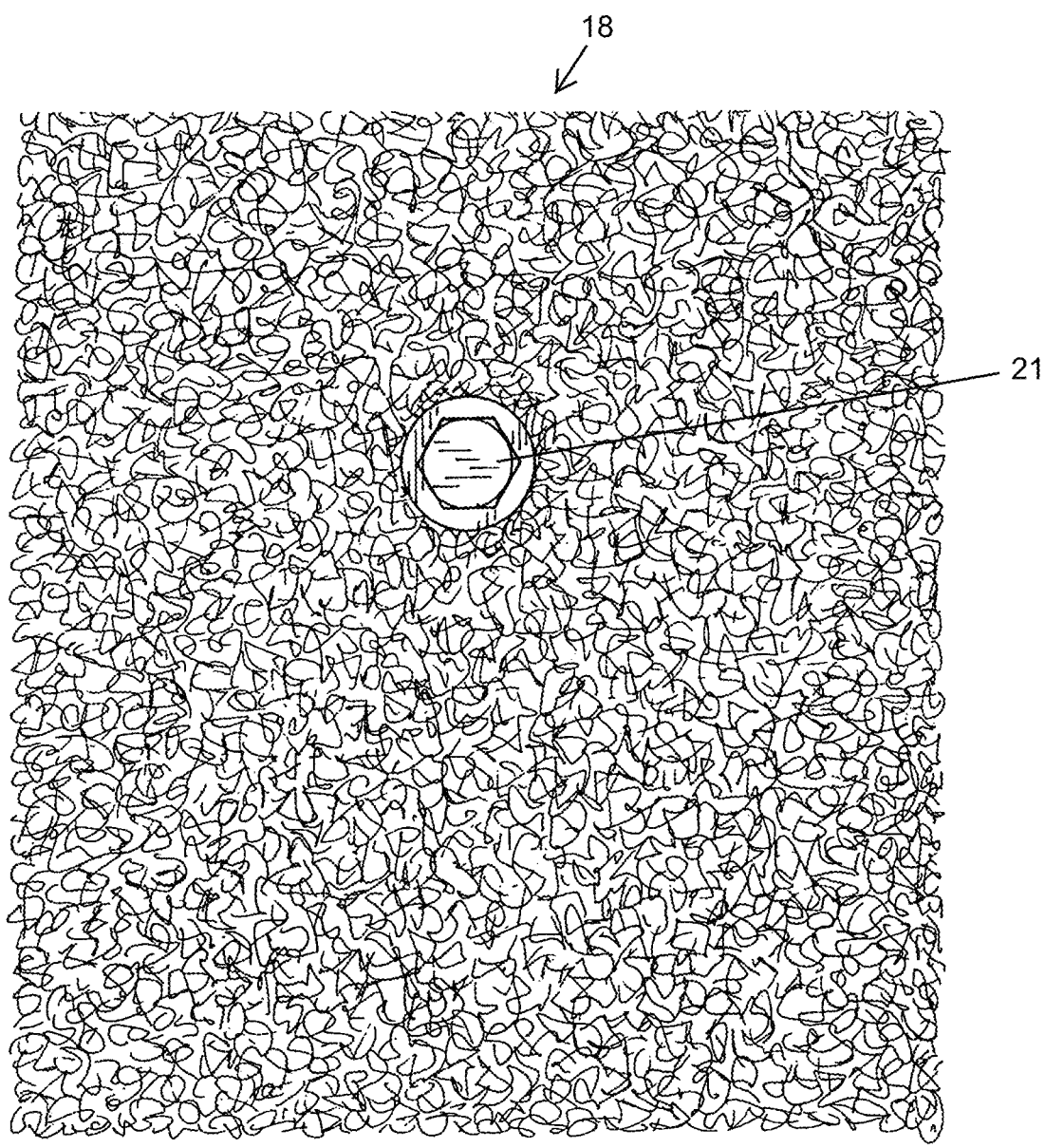
FIG. 11 is a close-up view illustrating the media material of the vertical hydroponic plant production apparatus, with bolt shown in the media material.

The grow tube 12 of the vertical hydroponic plant production apparatus 10 of the present disclosure can also be secured to a support pole utilizing a system of metal brackets whereas one bracket type is female and is designated as an "H" bracket 32 (shown in FIG. 2) and the other bracket type is male and is designated as a "Z" bracket 34 (shown in FIG. 7). The female "H" bracket 32 has a receiving portion and an anchoring portion to bolt to the back or side of the tower 12. The male "Z" bracket 34 consists of a vertical, upward facing tongue portion that fits into the receiving portion of the female bracket 32, and has a hole 36 through the middle, angled portion of the bracket 34 which fits over a support pole. The rear, downward facing vertical portion of the bracket 34 has a hole 38 drilled midway across the bottom of the bracket 34 and is threaded to receive a bolt. As weight is applied to the tongue portion of the bracket 34 through the placement of a bracketed tower, downward torque is applied across the "Z" bracket 34 causing a clutch action to affix the bracket tightly to the support pole. The torque attachment of this "Z" bracket 34 can be enhanced by tightening the bolt threaded into the rear of the bracket 34 against the support pole, applying even more pressure for bracket attachment.

In another embodiment, either the "Z" bracket 34 or the "H" bracket may be replaced with a vertical bar. In this example, the grow tube 12 is mounted to a vertical bar by means of the H bracket. This mode of action can be accomplished with an H bracket attached to a grow tube allowing the tube to slide up and down the vertical bar or pole as needed. In another example, the H bracket (or a variation on the basic form of the H bracket) may be attached to the back of the grow tube allowing the tube to slide onto a vertical bar to be mounted.

In another embodiment, the media insert or media material 18 of the vertical hydroponic plant production apparatus and system 10 of the present disclosure may be altered in several ways to serve a diverse range of functions. The media 18 can be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the tower housing 12. This alteration allows compost based hydroponic plant production using regular irrigation water, with plant nutrients supplied by the compost or other additive.

In another embodiment of the present disclosure, the top, sides, and corners of the media material or media insert 18 may also be cut, rounded, or cut at an angle to reduce biosolids accumulation, algal growth, or to enhance water distribution through the media 18, depending on application.

In another embodiment of the present disclosure, multiple media inserts or media material 18 may be used in the grower tubes or towers 12 allowing multiple age or vegetative stages of plants to be incorporated into each grow tube or tower 12.

In another embodiment, worms may also be integrated into the grow tubes or tower 12. The media material of the present disclosure may be designed to allow for the correct mesh or pore size to accommodate worm movement through the media material 18. As will be understood by one skilled in the art once they understand the invention, media material 18 with a smaller or larger mesh or pore size may also be used depending on application.

The vertical hydroponic plant production apparatus and system 10 of the present disclosure is comparatively lightweight, inexpensive to manufacture (being based on common PVC extrusion techniques and existing polyethylene matrix material production), will not clog with nutrient solution, and requires much less labor to operate. The present disclosure can also be converted to more traditional horizontal production techniques if desired, eliminating the risk inherent in changing production techniques for commercial producers.

In addition, traditional nitrogen and phosphorus removal techniques in aquaculture are very poor compared to removal using plant uptake for phytoremediation. Plants are able to remove N and P to levels an order of magnitude lower than any mechanical/chemical/microbial technique currently in use. The present disclosure phytoremediates water allowing for prolonged water use/recirculation and water conservation.

The vertical hydroponic plant production apparatus and system 10 of the present disclosure is an improvement on traditional harvesting and sales models where production systems are physically removed from the sales systems and shipping and handling results in a large percentage of producer losses, both financially and as wasted or expired produce. By selling live plants or fungi, the system and apparatus of the present disclosure prevents spoilage and shipping and handling is done partially by producers moving towers to market places, but primarily by consumers who are interested in fresh produce and the experience of picking and harvesting vegetables, herbs and greens for their own use. The grow tubes and towers are easily transported and are easy to stack, lift, and slide onto shelves. They essentially operate as a packaging system as well as a plant production system. Further, by utilizing individual towers, landscape designers and home users can scale their display or production system exactly to their specifications.

The vertical hydroponic plant production apparatus and system 10 of the present disclosure reduces necessary growing space tremendously. Typical reductions in growing space utilizing a vertical aeroponic technique have varied between 60% and 85% compared to conventional growth methods. Greenhouse growing space is very expensive, so the ability to increase crop size without increasing greenhouse space could prove very profitable. The present disclosure is also very affordable to manufacture, building on existing PVC pipe production infrastructure. Implementation of the present disclosure will also be simple, building on current hydroponic production technology.

The increased water recirculation time achieved with the vertical hydroponic plant production apparatus 10 of the present disclosure can eliminate one of the high costs and reduce the negative environmental effects of aquaculture, resulting in increased profits and a better industry image for aquacultural producers. Using the present disclosure can also allow aquacultural producers to diversify their product base and/or grow supplementary feed products (depending on the dietary needs of the fish).

The vertical hydroponic plant production apparatus 10 of the present disclosure has the potential to open up an entirely new system of production, transportation, shipping, handling, and display to vegetable producers, retailers, and consumers. This can result in fresher produce, a more pleasant customer shopping experience, reduced waste, reduced handling and packaging costs, fewer food miles, less plastic and packaging material consumption, and longer shelf life of purchased produce.

The vertical hydroponic plant production apparatus 10 of the present disclosure can be used by industrial institutions for phytoremediation of waste waters, using the towers as trickling, plant integrated filters for the removal of waste materials, and the remediation of waste waters for discharge.

The foregoing exemplary descriptions and the illustrative embodiments of the present disclosure have been explained in the drawings and described in detail, with varying modifications and alternative embodiments being taught. While the disclosure has been so shown, described and illustrated, it should be understood by those skilled in the art that equivalent changes in form and detail may be made therein without departing from the true spirit and scope of the disclosure, and that the scope of the present disclosure is to be limited only to the claims except as precluded by the prior art. Moreover, the disclosure as disclosed herein may be suitably practiced in the absence of the specific elements, which are disclosed herein.

The invention claimed is:

1. A vertical hydroponic plant production apparatus, the apparatus comprising:
   a hollow grow tube having a front face, a back face, an open first end, and an open second end and wherein said hollow grow tube has an internal width;
   wherein each grow tube has a length between the first end and the open second end and the front face has a width, and wherein the length of each grow tube is larger than the width of the front face;
   a slot formed in the front face of the grow tube, wherein said slot is formed continuously along the entire length of said front face of each grow tube from the first end to the second end or continuously to a point approximately four (4") inches to approximately six (6") inches from the first end of each grow tube, the slot having a width $\frac{1}{32}$nd to $\frac{31}{32}^{nd}$ the width of the front face; and
   a media material having a thickness substantially half the internal width of the grow tube, wherein the media material is two equal lengths so that the thickness of both halves of said media material are approximately equal to the internal width of the grow tube;
   wherein said grow tube is adapted to receive said media material, and wherein said media material is supported by the faces of the grow tube; and
   wherein the grow tube is positionable in a vertical position or semi vertical position allowing inclined, multi-angled crop production and multi-storied conveyor style crop production;
   wherein said grow tube is configured to allow plants to be inserted into the media material and grown through said slot; and
   wherein the grow tube has a shape selected from the group consisting of substantially square, rectangular, round, oval, octagon, pentagon and triangular.

2. The apparatus of claim 1, wherein said media material is a fibrous, non-woven matrix media material.

3. The apparatus of claim 1, further comprising a means for supporting said media within said tube.

4. The apparatus of claim 3, wherein said means for supporting said media is chosen from a bolt spanning the width of the media material, rivets, and metal bars.

5. A method of growing a plant in a vertical hydroponic plant production apparatus, the apparatus comprising:
   providing a hollow grow tube having a front face, a back face, a first end, and a second end and wherein said hollow grow tube has an internal width, wherein the grow tube has a shape selected from the group consisting of substantially square, rectangular, round, oval, octagon, pentagon and triangular;

wherein each grow tube has a length between the first end and the open second end and the front face has a width, and wherein the length of each grow tube is larger than the width of the front face;

forming a slot in the front face of the grow tube, wherein said slot is formed continuously along the entire length of said front face of each grow tube from the first end to the second end or continuously to a point approximately four (4") inches to approximately six (6") inches from the first end of each grow tube, the slot having a width $\frac{1}{32}$nd to $\frac{31}{32}^{nd}$ the width of the front face and the slot allowing the front face to expand outward during insertion;

providing a media material having a thickness substantially half the internal width of the grow tube, wherein the media material is two equal lengths so that the thickness of both halves of said media material are approximately equal to the internal width of the grow tube, wherein said media material is capable of receiving one or more plants through said slot and into said media material and growing said one or more plants in said media material;

wherein said grow tube is adapted to receive said media material, and wherein said media material is supported by the faces of the grow tube; and wherein the grow tube is positionable in a vertical position or semi vertical position allowing inclined, multi-angled crop production and multi-storied conveyor style crop production.

6. The method of growing a plant of claim 5, wherein said media material is a fibrous, non-woven matrix media material.

7. The method of growing a plant of claim 5, further comprising a means for supporting said media within said tube.

8. The method of growing a plant of claim 7, wherein said means for supporting said media is chosen from a bolt spanning the width of the media material, rivets, and metal bars.

* * * * *